US010232258B2

United States Patent
Thomas et al.

(10) Patent No.: US 10,232,258 B2
(45) Date of Patent: Mar. 19, 2019

(54) FUSING GAME CONTROL INPUTS

(71) Applicant: Microsoft Technology Licensing, LLC, Redmond, WA (US)

(72) Inventors: Evelyn Thomas, Bellevue, WA (US); Glenn Lavigne, Carnation, WA (US); Rudy Opavsky, Seattle, WA (US); Hamze Kalache, Bellevue, WA (US); Ali Aqel, Seattle, WA (US); Nicholas Freda, Bellevue, WA (US); Susanne Lynette Schell, Bellevue, WA (US); Melissa Natasha Alleyne, Seattle, WA (US); Richard Sauer, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/498,019

(22) Filed: Apr. 26, 2017

(65) Prior Publication Data

US 2018/0311578 A1 Nov. 1, 2018

(51) Int. Cl.
*A63F 13/06* (2006.01)
*A63F 13/42* (2014.01)
*A63F 13/22* (2014.01)
*A63F 13/24* (2014.01)
*A63F 13/95* (2014.01)

(52) U.S. Cl.
CPC .............. *A63F 13/42* (2014.09); *A63F 13/22* (2014.09); *A63F 13/24* (2014.09); *A63F 13/95* (2014.09)

(58) Field of Classification Search
CPC ........ A63F 13/22; A63F 13/42; A63F 13/843; A63F 2300/1018; A63F 2300/8088
See application file for complete search history.

(56) References Cited

U.S. PATENT DOCUMENTS

| | | | |
|---|---|---|---|
| 5,421,590 A | 6/1995 | Robbins | |
| 7,970,870 B2 | 6/2011 | Hinckley et al. | |
| 8,369,795 B2 | 2/2013 | Glaser et al. | |
| 9,378,622 B2 | 6/2016 | Tarantino | |
| 9,440,144 B2 | 9/2016 | Mikhailov | |
| 9,504,910 B2 | 11/2016 | Kronzon et al. | |
| 2006/0064495 A1 | 3/2006 | Tu | |

(Continued)

OTHER PUBLICATIONS

Gamez, Eduardo H. Calvillo, "The Role of Input Devices in the Gaming Experience", In Proceedings of the 14th European conference on Cognitive ergonomics: invent! Explore!, Aug. 28, 2007, pp. 289-291.

(Continued)

*Primary Examiner* — Lawrence Galka
(74) *Attorney, Agent, or Firm* — Alleman Hall Creasman & Tuttle LLP (57) ABSTRACT

A method for fusing game control inputs includes, on a computing device, receiving a first game control input from a first input device having a first housing and receiving a second game control input from a second input device having a second housing. The first game and second game control inputs are fused into a fused game control input mimicking a game control input from a single input device having a single housing. The fused game control input is provided to a video game application.

20 Claims, 6 Drawing Sheets

(56) References Cited

U.S. PATENT DOCUMENTS

2006/0154712 A1* 7/2006 Lum ...................... A63F 13/06
463/1
2007/0099702 A1 5/2007 Tupper
2011/0136568 A1 6/2011 Buhr
2014/0011590 A1* 1/2014 Aronzon ............... A63F 13/235
463/37

OTHER PUBLICATIONS

"Get to know your Xbox One Wireless Controller", https://support.xbox_com/en-US/xbox-one/accessories/xbox-one-wireless-controller, Retrieved on: Jan. 25, 2017, 3 pages.

\* cited by examiner

FUSING GAME CONTROL INPUTS

BACKGROUND

A variety of different types of input devices can be used to provide game control inputs to a computing device running a video game application. Such input devices can include dedicated video game controllers, as well as computer mice and keyboards, standalone joysticks or wheels, replica instruments, etc. A game control input from an input device will often indicate the status of various control mechanisms of the input device, such as whether buttons or triggers are depressed, whether any control sticks have been moved away from their neutral position, the state of any internal sensors, etc. Once received by the computing device, game control inputs can be used to control operation of the computing device, and/or provided to a running video game application, thereby controlling the game.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for fusing game control inputs includes, on a computing device, receiving a first game control input from a first input device having a first housing and receiving a second game control input from a second input device having a second housing. The first game and second game control inputs are fused into a fused game control input mimicking a game control input from a single input device having a single housing. The fused game control input is provided to a video game application.

DETAILED DESCRIPTION

As indicated above, various input devices can be used to control a video game application. As control mechanisms (e.g., buttons, control sticks, triggers) of an input device are manipulated, the input device sends game control inputs to a computing device running the video game application. However, input devices frequently used for this purpose, such as dedicated video game controllers and computer mouse/keyboard setups, typically require some degree of expertise and manual dexterity to be used effectively. This can make it difficult for some people to play and enjoy video games, such as people with missing or disabled fingers/hands, people with various neurological/movement disorders, young children who lack the motor skills necessary to use a video game controller, or even ordinary adults who are not familiar with a particular controller layout or are inexperienced with video games in general. For example, an individual with a missing hand would find it difficult to play a game using a video game controller intended to be gripped with two hands.

Accordingly, the present disclosure is directed to a technique for fusing game control inputs received from two or more input devices into a single fused game control input, which can then be provided to a video game application as if it had originated from a single input device. This would allow, for example, an individual with a missing hand to manipulate one input device using their remaining hand, while manipulating a second input device using their foot, or another part of their body. Similarly, a parent and child could each hold their own input device while cooperating to control the same in-game avatar. In this manner, a young child who would not ordinarily have the dexterity and/or mental capacity to play a video game can participate in the experience, while their parent operates the controls that the child is unable to use.

Though the present disclosure generally focuses on fusing game control inputs and providing such inputs to a video game application, it will be understood that these techniques can generally be used to fuse any suitable control inputs received by a computing device. Such control inputs may be received from any suitable input device, fused according to the techniques described herein, and provided to any suitable operating system, service, and/or application running on a computing device.

Figure 1:
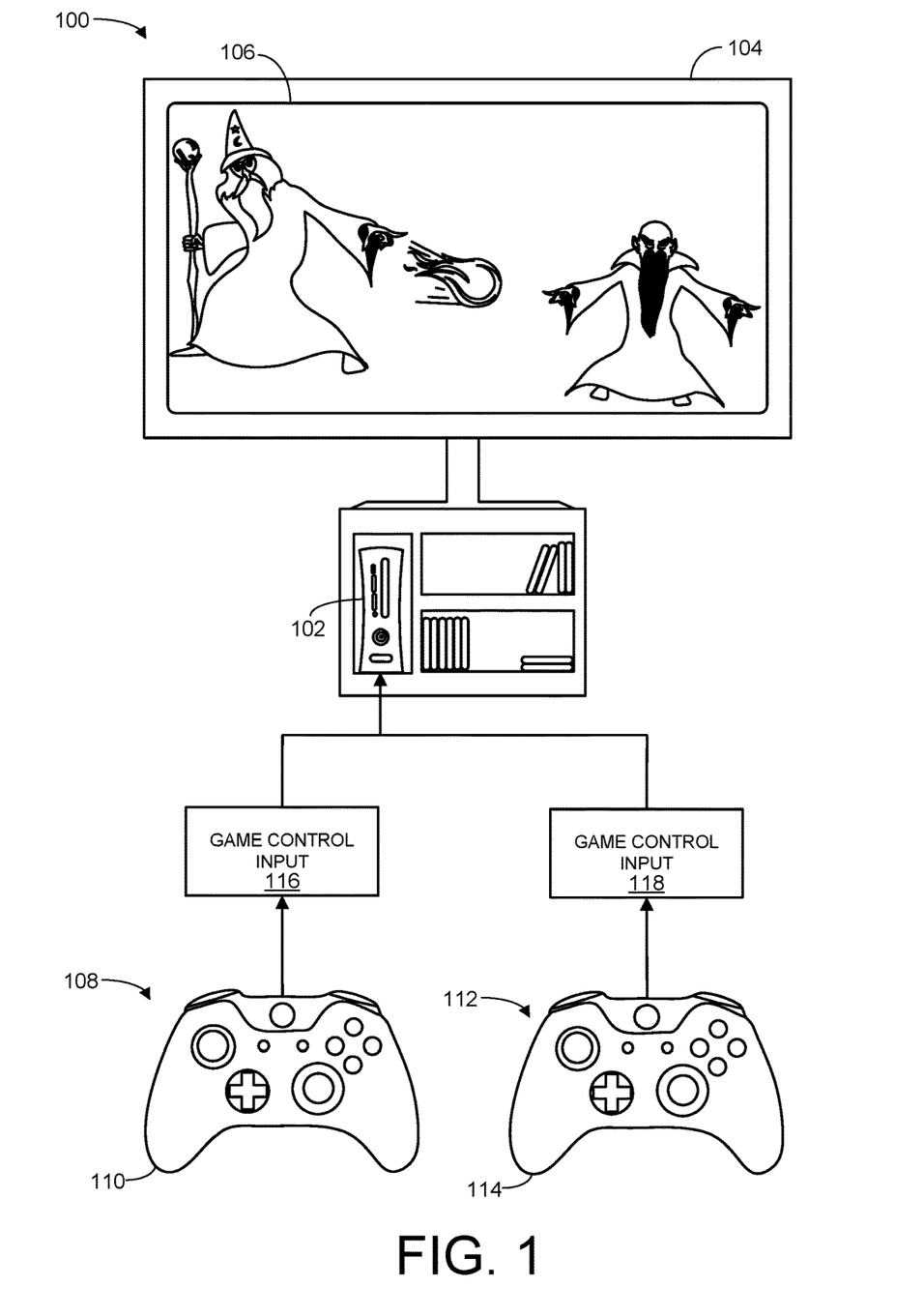
FIG. 1 schematically shows an example computing device receiving game control inputs from two example input devices.

FIG. 1 schematically shows an example environment 100 in which multiple game control inputs are fused to control a video game application. Environment 100 includes a computing device 102 communicatively coupled with a display 104. Computing device 102 is running a video game application and presenting visual content 106 associated with the video game application on display 104. In this example, the computing device is a video game console. However, it will be understood that other types of computing devices may additionally or alternatively be used, such as desktop computers, laptop computers, tablets, smartphones, media centers, wearable devices, augmented/virtual reality devices, and/or any other computer devices capable of receiving game control inputs from two or more input devices. As an example, computing device 102 may be implemented as computing system 600 described below with respect to FIG. 6.

Computing device 102 is in communication with two different input devices, including a first input device 108 having a first housing 110 and a second input device 112 having a second housing 114. As will be described in more detail below, input devices 108 and 112 are provided for the sake of example, and game control inputs received from any suitable type of input device may be fused. In some implementations, each input device may have a separate input device ID that is provided to the computing device as part of the game control input. Accordingly, each of first input device 108 and second input device 112 may have its own controller ID that is provided to computing device 102 so as to enable the computing device to distinguish between game control inputs provided by the two input devices.

Each of the two input devices are providing game control inputs to the computing device. Specifically, computing device 102 receives a first game control input 116 from the first input device 108 and a second game control input 118 from the second input device 112. Each input device may be communicatively linked with the computing device in any suitable fashion. For example, one or both of input device 108 and input device 112 may be coupled with the computing device via a wired connection, and/or either or both of the input devices may communicate with the computing device wirelessly via a suitable wireless protocol.

As will be described in more detail below, an input device may include one or more control mechanisms that may be manipulated to control the video game application. Accordingly, each game control input sent from an input device to computing device 102 may specify the current status of one or more of the control mechanisms. For example, a game control input may include an identifier of the input device from which it is originating, as well as indicate that a button or key having a particular identifier is depressed, a control stick having a particular identifier has been moved away from its neutral position, a trigger mechanism having a particular identifier has been depressed a certain amount, the input device has been tilted to have a particular orientation, etc. In some implementations, each game control input sent by an input device may include information regarding every control mechanism in the input device. In other implementations, each game control input may only include information for a subset of the control mechanisms, such as those mechanisms that currently have non-default states/values.

In some implementations, an input device may send game control inputs to a computing device as a continuous stream, each individual game control input indicating the status of one or more control mechanisms at a particular moment in time. In other implementations, game control inputs may be sent as control mechanisms are manipulated. In other words, an input device may only send a game control input after a button/trigger mechanism is depressed, a control stick is moved away from its neutral position, etc. In general, an input device may send game control inputs to a computing device with any suitable frequency.

Once received by the computing device, a game control input may be used to control operation of the computing device, and/or provided to a video game application. As an example, depression of a button on an input device may cause a change in operation of the computing device by changing a setting, launching an application, turning off the device, etc. Additionally, or alternatively, a game control input may be provided to a video game application, which will then interpret the game control input according to programming of the video game application. For example, a game control input that indicates movement of a control stick away from its neutral position may cause a video game application to move a player's in-game avatar, while depression of a button may cause the in-game avatar to perform a specific action. It will be understood that these examples are non-limiting, and computing devices/video game applications may interpret game control inputs in any suitable manner.

Computing devices used to run video game applications are often capable of supporting multiple input devices simultaneously. For example, in "multiplayer" game scenarios, a single computing device running a single video game application may receive multiple simultaneous streams of game control inputs, each different stream corresponding to different input devices used by different players. In such scenarios, each of the different streams are provided directly to the video game application, where they are often used to control gameplay for different players. Because computing devices typically interpret inputs from different controllers as corresponding to different players, typical computing devices do not allow multiple input devices to cooperatively mimic a single input device. This can inhibit or prevent a variety of potential players who have difficulty using typical input devices from playing or enjoying video games. For example, as described above, people with movement disorders, missing appendages, young children, etc., may have difficulty using typical input devices.

Figure 2:
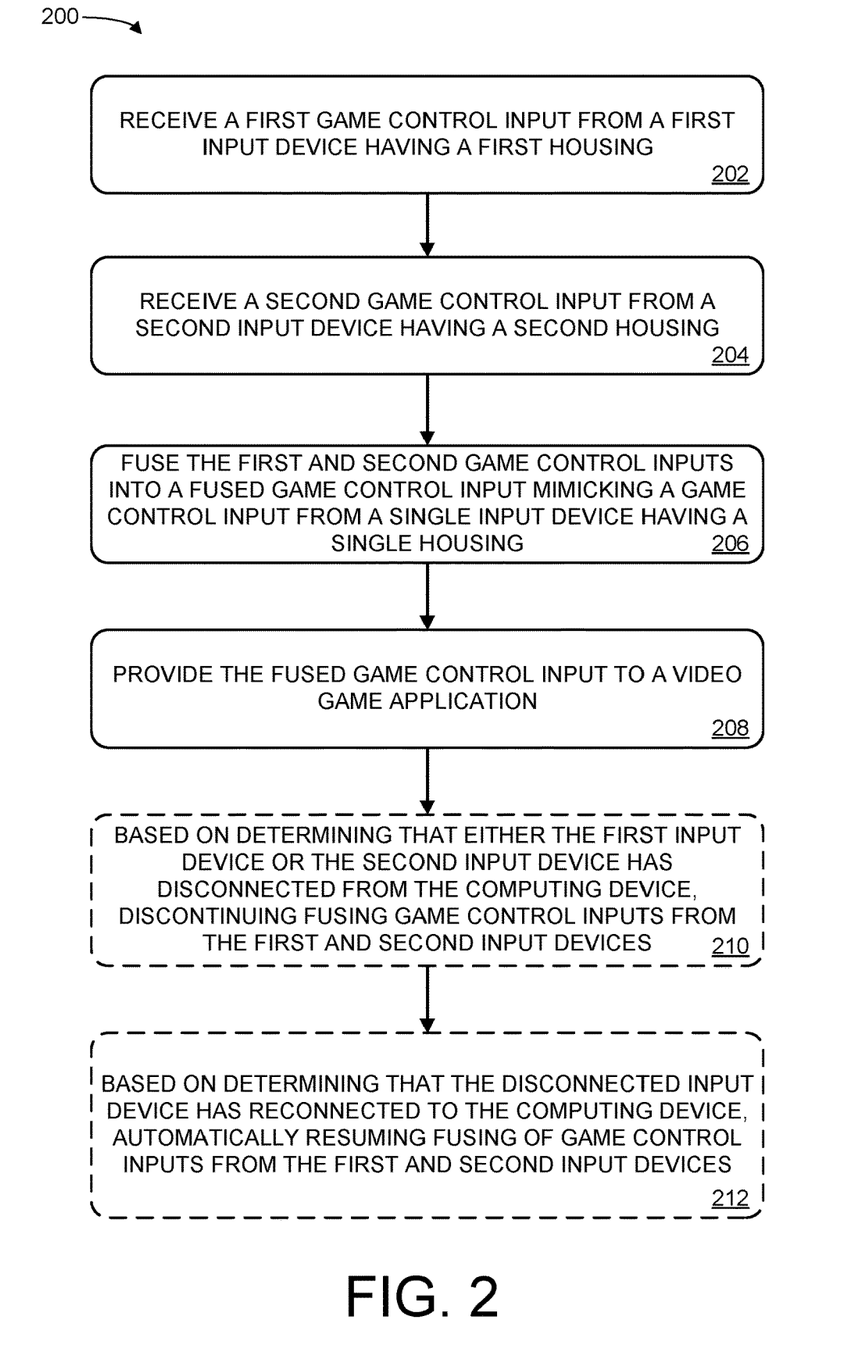
FIG. 2 illustrates an example method for fusing game control inputs.

Accordingly, FIG. 2 illustrates an example method 200 for fusing game control inputs received from two separate input devices into a single fused game control input. The fused game control input mimics a game control input received from a single input device having a single housing and/or controller ID, such that the fused game control input may be provided to a video game application as if it had been received from a single input device. In this manner, multiple input devices can be used together to control a video game application without requiring that the video game application be specifically configured to fuse simultaneous game control inputs from multiple input devices. In other words, multiple input devices can be used together to control virtually any video game application, although from the perspective of the video game application, each fused game control input appears to originate from a single input device.

Before game control inputs from two input devices are fused, game control input fusing may first be enabled by "pairing" two input devices together via a user interface provided by the computing device. This may be done in a variety of suitable ways. Any suitable input devices may be paired together, even if the input devices are not the same type (e.g., a video game controller may be paired with a computer keyboard, or other type of input device). In some implementations, once paired, each of the first and second input devices may be associated with the same user profile of a user of the computing device. Accordingly, game control inputs received from the two paired input devices may be automatically fused and attributed to the user.

At 202, method 200 includes receiving a first game control input from a first input device having a first housing and/or controller ID. At 204, method 200 includes receiving a second game control input from a second input device having a second housing or controller ID. As will be described in more detail below, each of the first and second game control inputs may correspond to different in-game controls, or the same in-game control. Further, each of the first and second game control inputs may correspond to the same or different control mechanisms of each of the two input devices. For example, both input devices may be the same type of video game controller and accordingly have the same layout of control mechanisms, and the game control inputs may indicate that the same button is depressed on each controller. The first and second game control inputs may be received sequentially—i.e., one before the other—or the first and second game control inputs may be received substantially at the same time. Further, though the present disclosure focuses on fusing two game control inputs from two input devices, game control inputs from more input devices can also be fused. For example, method 200 may include receiving a third game control input from a third input device having a third housing, and fusing the first, second, and third game control inputs into the fused game control input.

In some cases, one or both of the first and second input devices may be a video game controller. For example, as described above with respect to FIG. 1, computing device 102 receives first game control input 116 from first input device 108 having first housing 110, and second game control input 118 from second input device 112 having second housing 114, where each of first input device 108 and second input device 112 are video game controllers.

Figure 3A:
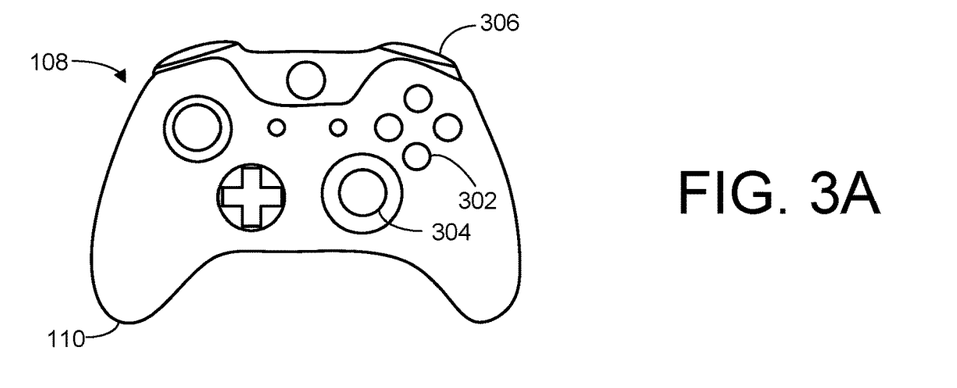
FIGS. 3A-3C schematically show multiple example input devices.

Turning briefly to FIG. 3A, a more detailed view of input device 108 is shown. Input device 108 includes several control mechanisms that may be manipulated to control a video game application. Specifically, input device 108 includes a button 302, a control stick 304, and a trigger mechanism 306. When sending a game control input to a computing device, input device 108 may report the status of button 302 as one of two binary states (i.e., depressed or not-depressed). In contrast, trigger mechanism 306 may be an analog mechanism, such that the input device reports a depression value indicating the extent to which the trigger mechanism is depressed. In some cases, such a depression value may take the form of a percentage—e.g., a depression value of 0% may indicate that the trigger mechanism is not depressed at all, while a depression value of 100% may indicate that the trigger mechanism is fully depressed. Control stick 304 may take the form of a stick extending away from the input device that is moveable in one or more directions, though occupies a neutral position when no external forces are applied to it. Accordingly, the input device may report the current position of the control stick relative to its neutral position (e.g., direction and magnitude).

Figure 3B:
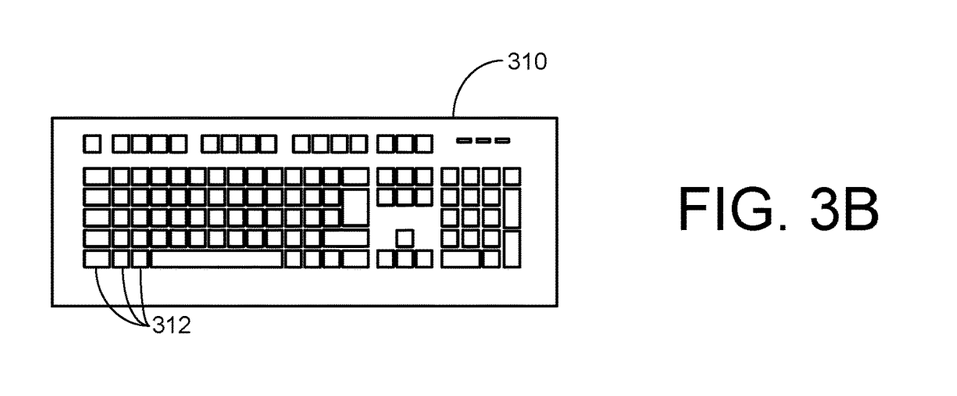

Though this description primarily focuses on input devices taking the form of traditional video game controllers, it will be understood that computing devices may receive and fuse game control inputs from other types of input devices. In some implementations, either or both of the first and second input devices may take the form of a computer keyboard, such as input device 310, which is shown in FIG. 3B. Input device 310 includes a plurality of individual keys 312, each of which may have a different identity/function. Accordingly, a game control input sent by input device 310 may indicate which, if any, of keys 312 are depressed, and this information may be interpreted by a computing device/video game application. In some settings, a computer keyboard such as input device 310 may control a video game application in conjunction with another input device, such as a computer mouse.

Figure 3C:
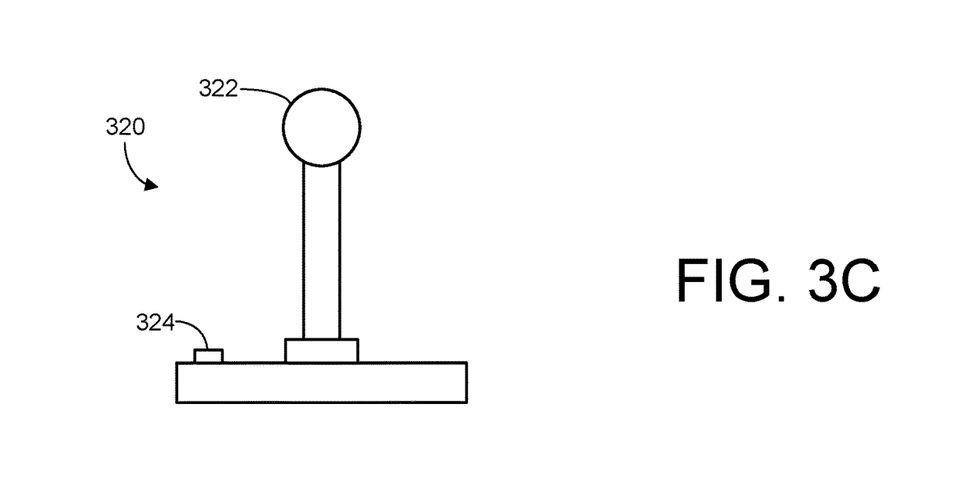

In other implementations, either or both of the first and second input devices may take the form of a joystick, such as input device 320, which is schematically shown in FIG. 3C. As shown, input device 320 includes a control stick 322 and a button 324, the status of each of which may be reported by input device 320 as part of a game control input.

It will be understood that each of input devices 108, 310, and 320 are presented as examples, and computing devices may additionally or alternatively support other types of input devices having any of a variety of form factors. Further, input devices may have any suitable number and variety of control mechanisms. Such control mechanisms may include various mechanisms not described herein. Further, an input device used to control a video game application need not include the control mechanisms described above (i.e., buttons, control sticks, and triggers). Further, input devices may include control mechanisms similar to those described above that behave in different ways (e.g., buttons with multiple depression states, control sticks with differing ranges of motion, or trigger mechanisms having different properties).

Figure 4A:
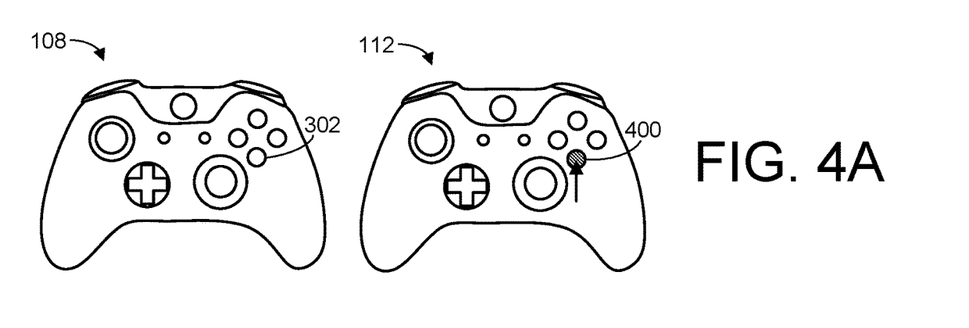
FIGS. 4A-4C schematically show manipulation of various control mechanisms of two example input devices.
Figure 4B:
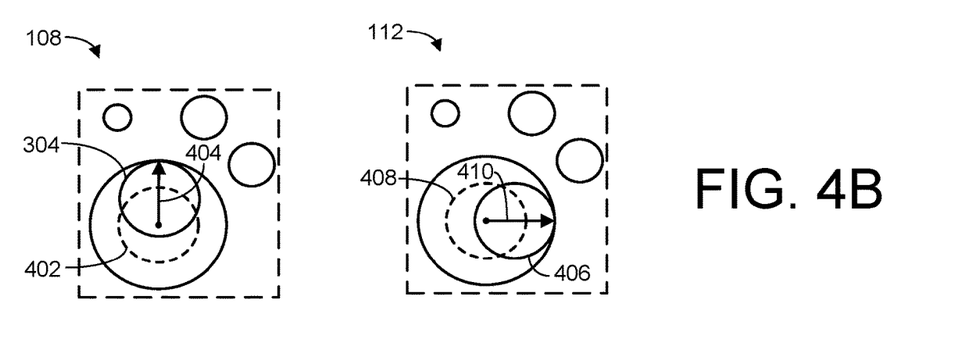
Figure 4C:
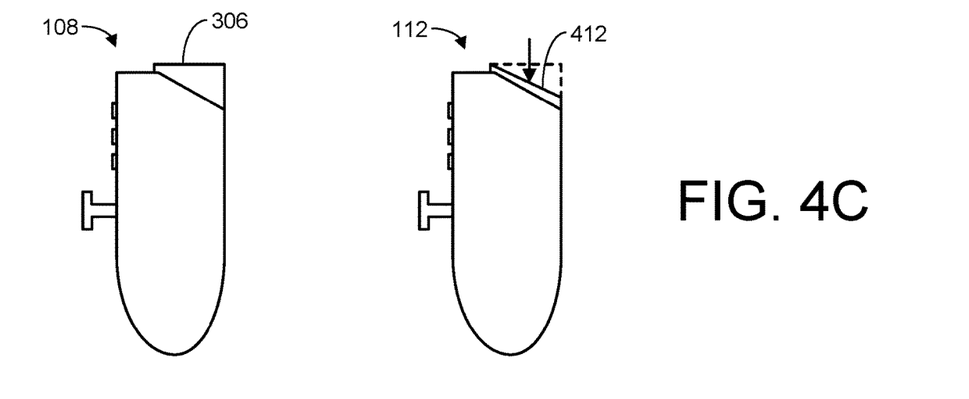

Once again focusing on input devices 108 and 112, FIGS. 4A-4C schematically illustrate how various control mechanisms of the input devices may be manipulated to control a video game application. Specifically, FIG. 4A once again shows first input device 108, including button 302 in a non-depressed state. Accordingly, a game control input sent from input device 108 to a computing device (e.g., computing device 102) may indicate a depression state of button 302, the depression state indicating that button 302 is not depressed. FIG. 4A also shows second input device 112 having a second button 400, where second button 400 has a depressed state, as indicated by the gray color and arrow pointing to button 400. Accordingly, a game control input sent from second input device 112 may indicate a depression state of second button 400, the depression state indicating that second button 400 is depressed. In some implementations, each of first button 302 and second button 400 may correspond to a same in-game control (e.g., performing an action, selecting an option, using an ability).

FIG. 4B shows portions of each of first input device 108 and second input device 112. As shown, control stick 304 of first input device 108 has been moved away from its neutral position 402. The direction and magnitude of this movement is given by displacement vector 404. Accordingly, a game control input sent by first input device 108 may indicate, in some form, the displacement of control stick 304 away from its neutral position 402. Similar to first input device 108, second input device 112 includes a second control stick 406. As with control stick 402, second control stick 406 typically occupies a neutral position 408 when no external forces are applied to the control stick, though is currently occupying a position other than its neutral position. The displacement between the current position and neutral position of control stick 406 is given by displacement vector 410, indicating the direction and magnitude of the displacement. Accordingly, a game control input sent by second input device 112 may indicate, in some form, the displacement of control stick 406 away from its neutral position 408. In some implementations, each of control stick 304 and control stick 406 may correspond to the same in-game control (e.g., navigating a menu or moving a player's in-game avatar).

FIG. 4C shows side views of first input device 108 and second input device 112. As shown, trigger mechanism 306 of first input device 108 is in a non-depressed state. Accordingly, a game control input sent by first input device 108 may indicate a depression value for trigger mechanism 306, the depression value indicating that trigger mechanism 306 is not depressed (e.g., a depression value of 0%). In contrast, second input device 112 includes a second trigger mechanism 412 in a semi-depressed state. Accordingly, a game control input sent by second input device 112 may indicate a depression value for second trigger mechanism 412, the depression value indicating the extent to which second trigger mechanism 412 is depressed (e.g., a depression value of 80%). In some implementations, each of first trigger mechanism 306 and second trigger mechanism 412 may correspond to the same in-game control (e.g., firing a weapon or applying an accelerator).

Figure 5:
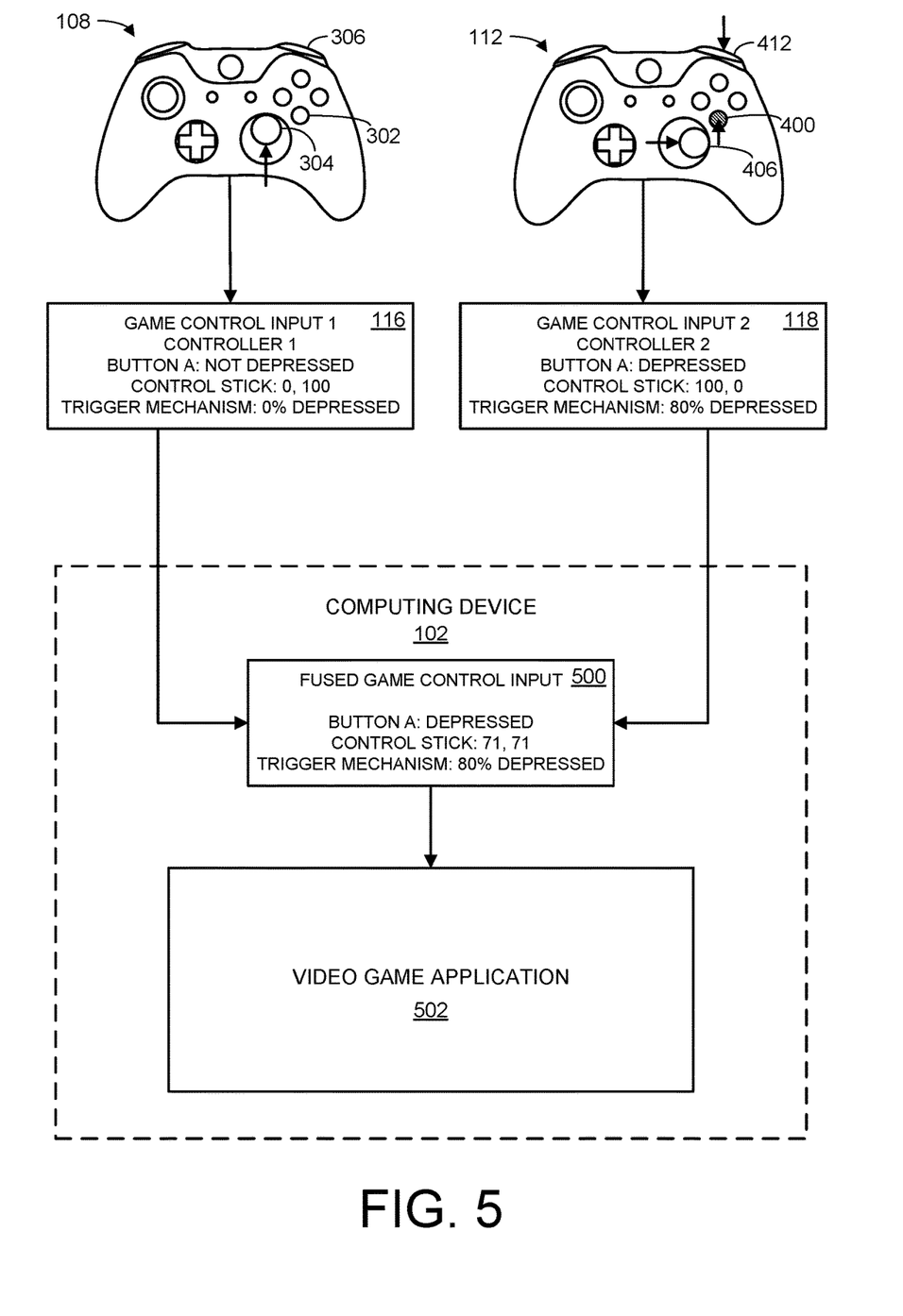
FIG. 5 schematically shows fusing of two game control inputs received by a computing device into a fused game control input.

Returning briefly to FIG. 2, at 206, method 200 includes fusing the first and second game control inputs into a fused game control input mimicking a game control input from a single input device having a single housing and/or controller ID. This is schematically illustrated in FIG. 5, which shows computing device 102 receiving game control inputs 116 and 118 from first input device 108 and second input device 112. Each of game control inputs 116 and 118 indicate the current status of control mechanisms of the first and second input devices. Specifically, game control input 116 indicates that button 302 of input device 108 is not depressed, indicates a displacement of control stick 304 away from its neutral position, and indicates a depression value of trigger mechanism 306. Similarly, game control input 118 indicates that button 400 is depressed, indicates a displacement of control stick 406 away from its neutral position, and indicates a depression value of trigger mechanism 412.

Once received by computing device 102, first game control input 116 and second game control input 118 are fused into a fused game control input 500. Fusing of game control inputs may be done in a variety of suitable ways. As a nonlimiting example, for two buttons corresponding to the same in-game control, the fused game control input may indicate that a button corresponding to the in-game control is depressed based on, according to the first and second game control inputs, either or both of the first button and the second button being depressed. Accordingly, fused game control 500 indicates that "Button A" is depressed, as button 400 of second input device 112 is depressed.

As another example, for two control sticks corresponding to the same in-game control, the fused game control input may include a fused displacement based on addition of each of the first and second displacements. In some implementations, the two displacements may be added as vectors, such that both the magnitude and direction of each displacement is taken into account. To give an example, if one control stick was pointed exactly "north" and had a magnitude of 100% of the control stick's available movement range, and another control stick was pointed exactly "east," also with a magnitude of 100%, then the fused game control input would show the control stick pointing exactly "northeast," with a normalized magnitude of 100%. This example is illustrated in FIG. 5. As another example, if a first control stick was pointing "north" with a magnitude of 100%, and a second control stick was pointing "south" with a magnitude of 50%, then adding the two displacements would give a fused game control input that shows the control stick pointing "north" with a magnitude of 50%.

In some examples, adding of displacements to give a fused displacement may be normalized or capped such that the fused displacement cannot be greater than an actual maximum displacement of a real control stick. For example, if two game control inputs indicated that two control sticks were each pointing "north" with a magnitude of 100%, fusing the two displacements may result in a fused game control input that shows the control stick pointing "north" with a magnitude of 200%. Because it would not be possible to observe this displacement with a real control stick, the fused game control input may be capped to have a maximum magnitude of 100%. In some examples, the cap is dynamically set at the largest magnitude of any of the individual inputs being fused.

As still another example, for two trigger mechanisms corresponding to the same in-game control, the fused game control input may indicate a fused depression value equal to a higher of the first and second depression values. Using the example illustrated in FIG. 5, trigger mechanism 306 has a depression value of 0%, while trigger mechanism 412 has a depression value of 80%. Accordingly, fused game control input 500 indicates that the trigger mechanism has a depression value of 80%.

It will be understood that the above game control input fusion techniques are provided as examples, and that fusing of two or more game control inputs into a fused game control input may be done in a variety of ways. For example, in some implementations, a higher weighting may be given to the first game control input than to the second game control input, or vice versa. Further, the specific information included in each game control input, including the specific formats of a button depression state, control stick displacement, and trigger mechanism depression value, can vary from implementation to implementation.

Returning briefly to FIG. 2, at 208, method 200 includes providing the fused game control input to a video game application. This is schematically illustrated in FIG. 5, in which computing device 102 provides fused game control input 500 to a video game application 502. Notably, from the perspective of the video game application, the fused game control input appears to originate from a single input device having a single housing. In this manner, multiple input devices may be used to cooperatively control a video game application that is not specifically configured to support or interpret simultaneous game control inputs. It will be understood that fused game control inputs can be provided to other types of software on a computing device instead of or in addition to a video game application. For example, a fused game control input may be used to alter the operation of the computing device, provided to a productivity application or media player, etc.

In some situations, as a computing device is receiving and fusing game control inputs from two input devices, one of the input devices may become disconnected from the computing device. For example, a wired connection between the computing device and the input device may be interrupted, the input device may run out of power, be removed from a wireless range of the computing device, etc. Accordingly, returning briefly to FIG. 2, based on determining that either the first input device or the second input device has become disconnected from the computing device, method 200 optionally includes, at 210, discontinuing fusing game control inputs from the first and second input devices. Should the disconnected input device be reconnected, then at 212 method 200 optionally includes automatically resuming fusing of game control inputs from the first and second input devices. In this manner, pairing of the two input devices may be automatically restored, without requiring manual reestablishing of the pairing after one of the two input devices unexpectedly disconnects from the computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
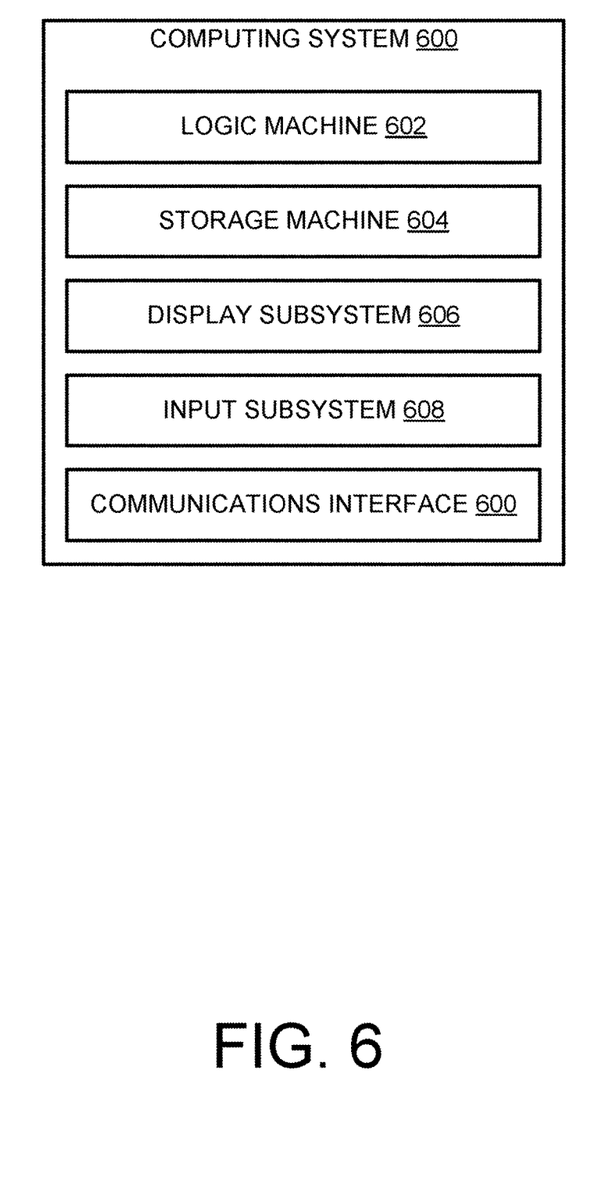
FIG. 6 schematically shows an example computing device.

FIG. 6 schematically shows a non-limiting embodiment of a computing system 600 that can enact one or more of the methods and processes described above. Specifically, computing system 600 may be configured to receive first and second game control inputs from first and second input devices, fuse the first and second game control inputs into a fused game control input, and provide the fused game control input to a video game application. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In an example, a method for fusing game inputs comprises: on a computing device, receiving a first game control input from a first input device having a first housing; on the computing device, receiving a second game control input from a second input device having a second housing; on the computing device, fusing the first and second game control inputs into a fused game control input mimicking a game control input from a single input device having a single housing; and on the computing device, providing the fused game control input to a video game application. In this example or any other example, the first and second game control inputs correspond to different in-game controls. In this example or any other example, the first and second game control inputs correspond to a same in-game control. In this example or any other example, the first input device includes a first button and the second input device includes a second button, each of the first and second buttons corresponding to the same in-game control, the first game control input indicates a depression state of the first button and the second game control input indicates a depression state of the second button, and the fused game control input indicates that a button corresponding to the in-game control is depressed based on, according to the first and second game control inputs, either or both of the first button and the second button being depressed. In this example or any other example, the first input device includes a first control stick and the second input device includes a second control stick, each of the first and second control sticks corresponding to the same in-game control, the first game control input indicates a first displacement of the first control stick away from a neutral position of the first control stick and the second game control input indicates a second displacement of the second control stick away from a neutral position of the second control stick, and the fused game control input indicates a fused displacement based on addition of each of the first and second displacements. In this example or any other example, the first input device includes a first trigger mechanism and the second input device includes a second trigger mechanism, each of the first and second trigger mechanisms corresponding to the same in-game control, the first game control input indicates a first depression value of the first trigger mechanism and the second game control input indicates a second depression value of the second trigger mechanism, and the fused game control input indicates a fused depression value equal to a higher of the first and second depression values. In this example or any other example, one or both of the first and second input devices is a video game controller. In this example or any other example, one or both of the first and second input devices is a computer keyboard. In this example or any other example, one or both of the first and second input devices includes a joystick. In this example or any other example, each of the first input device and the second input device is associated with a same user profile of a user of the computing device. In this example or any other example, the method further comprises, based on determining that either the first input device or the second input device has disconnected from the computing device, discontinuing fusing game control inputs from the first and second input devices. In this example or any other example, the method further comprises, based on determining that the disconnected input device has reconnected to the computing device, automatically resuming fusing of game control inputs from the first and second input devices. In this example or any other example, the method further comprises, on the computing device, receiving a third game control input from a third input device having a third housing, and fusing the first, second, and third game control inputs into the fused game control input. In this example or any other example, fusing the first and second game control inputs includes giving a higher weighting to the first game control input than to the second game control input.

In an example, a computing device comprises: a logic machine; and a storage machine holding instructions executable by the logic machine to: receive a first control input from a first input device having a first housing; receive a second control input from a second input device having a second housing; fuse the first and second control inputs into a fused control input, the fused control input mimicking a control input from a single input device having a single housing; and output the fused control input. In this example or any other example, the first and second control inputs correspond to a same control. In this example or any other example, the first input device includes a first button and the second input device includes a second button, each of the first and second buttons corresponding to the same control, the first control input indicates a depression state of the first button and the second control input indicates a depression state of the second button, and the fused control input indicates that a button corresponding to the control is depressed based on, according to the first and second control inputs, either or both of the first button and the second button being depressed. In this example or any other example, the first input device includes a first control stick and the second input device includes a second control stick, each of the first and second control sticks corresponding to the same control, the first control input indicates a first displacement of the first control stick away from a neutral position of the first control stick and the second game control input indicates a second displacement of the second control stick away from a neutral position of the second control stick, and the fused control input indicates a fused displacement based on addition of each of the first and second displacements. In this example or any other example, the first input device includes a first trigger mechanism and the second input device includes a second trigger mechanism, each of the first and second trigger mechanisms corresponding to the same control, the first control input indicates a first depression value of the first trigger mechanism and the second control input indicates a second depression value of the second trigger mechanism, and the fused control input indicates a fused depression value equal to a higher of the first and second depression values.

In an example, a method for fusing game control inputs comprises: on a computing device, receiving a first game control input from a first video game controller having a first controller ID; on the computing device, receiving a second game control input from a second video game controller having a second controller ID, each of the first game control input and the second game control input corresponding to a same control mechanism of the first and second video game controllers; on the computing device, fusing the first and second game control inputs into a fused game control input, the fused game control input mimicking a game control input from the control mechanism of a single video game controller having a single controller ID; and on the computing device, providing the fused game control input to a video game application.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for fusing game control inputs, comprising:
   on a computing device, receiving a first game control input from a first input device having a first housing;
   on the computing device, receiving a second game control input from a second input device having a second housing;
   on the computing device, fusing the first and second game control inputs into a fused game control input such that the first game control input is given a higher weighting than the second game control input, the fused game control input mimicking a game control input from a single input device having a single housing; and
   on the computing device, providing the fused game control input to a video game application.

2. The method of claim 1, where the first and second game control inputs correspond to different in-game controls.

3. The method of claim 1, where the first and second game control inputs correspond to a same in-game control.

4. The method of claim 3, where the first input device includes a first button and the second input device includes a second button, each of the first and second buttons corresponding to the same in-game control, where the first game control input indicates a depression state of the first button and the second game control input indicates a depression state of the second button, and where the fused game control input indicates that a button corresponding to the in-game control is depressed based on, according to the first and second game control inputs, at least the first button being depressed.

5. The method of claim 1, where one or both of the first and second input devices is a video game controller.

6. The method of claim 1, where one or both of the first and second input devices is a computer keyboard.

7. The method of claim 1, where one or both of the first and second input devices includes a joystick.

8. The method of claim 1, where each of the first input device and the second input device is associated with a same user profile of a user of the computing device.

9. The method of claim 1, further comprising, based on determining that either the first input device or the second input device has disconnected from the computing device, discontinuing fusing game control inputs from the first and second input devices.

10. The method of claim 9, further comprising, based on determining that the disconnected input device has reconnected to the computing device, automatically resuming fusing of game control inputs from the first and second input devices.

11. The method of claim 1, further comprising, on the computing device, receiving a third game control input from a third input device having a third housing, and fusing the first, second, and third game control inputs into the fused game control input.

12. A computing device, comprising:
    a logic machine; and
    a storage machine holding instructions executable by the logic machine to:
        receive a first control input from a first input device having a first housing, the first control input indicating a first displacement of a first control stick of the first input device away from a neutral position of the first control stick;
        receive a second control input from a second input device having a second housing, the second control input indicating a second displacement of a second control stick of the second input device away from a neutral position of the second control stick, each of the first and second control sticks corresponding to a same in-game control;
        fuse the first and second control inputs into a fused control input indicating a fused displacement based on addition of the first and second of each of the first and second displacements, the fused control input mimicking a control input from a single input device having a single housing; and
        output the fused control input.

13. The computing device of claim 12, where each of the first input device and the second input device is associated with a same user profile of a user of the computing device.

14. The computing device of claim 12, where the instructions are further executable to, based on determining that either the first input device or the second input device has disconnected from the computing device, discontinue fusing game control inputs from the first and second input devices.

15. The computing device of claim 14, where the instructions are further executable to, based on determining that the disconnected input device has reconnected to the computing device, automatically resume fusing of game control inputs from the first and second input devices.

16. A computing device, comprising:
    a logic machine; and
    a storage machine holding instructions executable by the logic machine to:
        receive a first control input from a first input device having a first housing, the first control input indicating a first depression value of a first trigger mechanism of the first input device;
        receive a second control input from a second input device having a second housing, the second control input indicating a second depression value of a second trigger mechanism of the second input device, each of the first and second trigger mechanisms corresponding to a same in-game control;
        fuse the first and second control inputs into a fused control input indicating a fused depression value equal to a higher of the first and second depression values, the fused control input mimicking a control input from a single input device having a single housing; and
        output the fused control input.

17. The computing device of claim 16, where each of the first input device and the second input device is associated with a same user profile of a user of the computing device.

18. The computing device of claim 16, where the instructions are further executable to, based on determining that either the first input device or the second input device has disconnected from the computing device, discontinue fusing game control inputs from the first and second input devices.

19. The computing device of claim 18, where the instructions are further executable to, based on determining that the disconnected input device has reconnected to the computing device, automatically resume fusing of game control inputs from the first and second input devices.

20. The computing device of claim 16, where one or both of the first and second input devices is a video game controller.

* * * * *